(12) United States Patent
Chin (10) Patent No.: US 7,389,122 B2
(45) Date of Patent: Jun. 17, 2008

(54) METHOD AND APPARATUS TO PROVIDE A CONTINUOUS USEABLE WIRELESS NETWORK CONNECTION (75) Inventor: Allan Chin, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 449 days.

(21) Appl. No.: 11/015,777

(22) Filed: Dec. 17, 2004

(65) Prior Publication Data

US 2006/0133330 A1    Jun. 22, 2006

(51) Int. Cl.
*H04Q 7/20* (2006.01)
*H04Q 7/24* (2006.01)

(52) U.S. Cl. .................. 455/525; 455/524; 370/338
(58) Field of Classification Search ............... None
See application file for complete search history.

(56) References Cited

U.S. PATENT DOCUMENTS 6,119,003 A    9/2000    Kukkohovi

| | | | |
|---|---|---|---|
| 2003/0134637 A1 | 7/2003 | Cooper | |
| 2004/0001467 A1 | 1/2004 | Cromer et al. | |
| 2004/0246922 A1* | 12/2004 | Ruan et al. | 370/331 |
| 2005/0113031 A1* | 5/2005 | Turner et al. | 455/67.11 |
| 2005/0208950 A1* | 9/2005 | Hasse | 455/453 |

FOREIGN PATENT DOCUMENTS

| | | |
|---|---|---|
| TW | 200403764 | 9/2000 |
| TW | 200409494 | 10/2000 |
| TW | 200415887 | 12/2000 |
| WO | WO-9810617 A1 | 3/1998 |
| WO | WO-2006066181 A1 | 6/2006 |

OTHER PUBLICATIONS

"Enterprise Grade Wireless LAN Client", *Intel PROSet Wireless Software 9.0*, (2004), 10 pages.
"Seamless Connectivity to Wireless Local Area Networks", *Intel Technology Journal*, vol. 07, Issue 3,(Aug. 19, 2003),12 pages.

* cited by examiner

*Primary Examiner*—Nick Corsaro
*Assistant Examiner*—Joel Ajayi
(74) *Attorney, Agent, or Firm*—The Law Offices of John C. Scott; John C. Scott (57) ABSTRACT A useable wireless network connection is continuously maintained for a client device.

21 Claims, 5 Drawing Sheets

METHOD AND APPARATUS TO PROVIDE A CONTINUOUS USEABLE WIRELESS NETWORK CONNECTION

TECHNICAL FIELD

The invention relates generally to wireless networking and, more particularly, to techniques and structures for obtaining a useable wireless connection.

BACKGROUND OF THE INVENTION

In a wireless network, a wireless client device may indicate to a user that a good wireless network connection exists whenever the client device is successfully associated with a wireless AP. However, other requirements (i.e., other than association) may need to be satisfied before a "useable" network connection is achieved. Thus, a user may be under the impression that data transfers to/from the network may be carried out at a time when no such capability exists.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
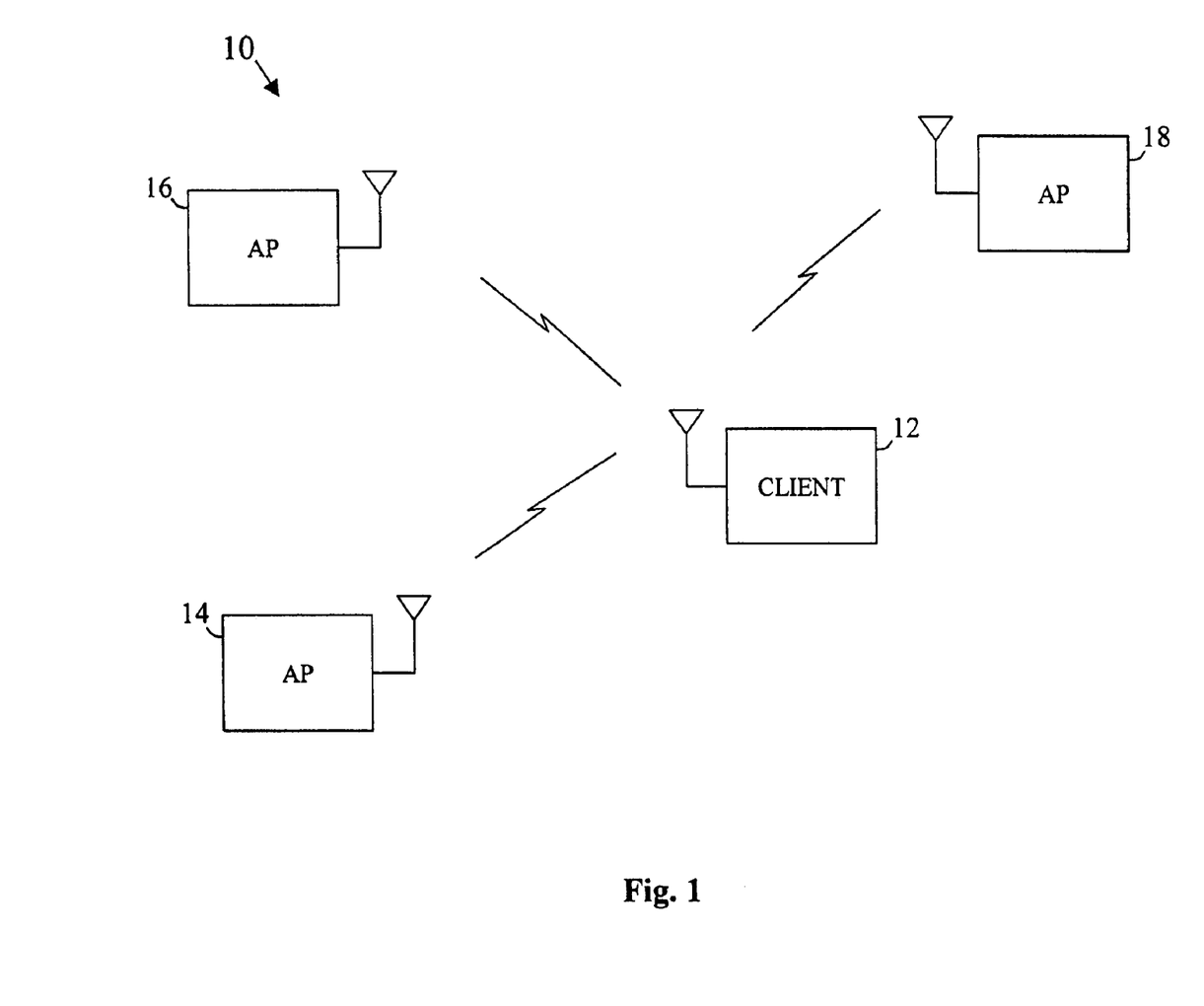
FIG. 1 is a block diagram illustrating an example wireless network arrangement in which the present invention may be practiced.

FIG. 1 is a block diagram illustrating an example wireless network arrangement 10 in which the present invention may be practiced. As illustrated, a wireless client device 12 is operating in the vicinity of a number of wireless access points (APs) 14, 16, 18. To obtain access to a larger network, the client device 12 needs to associate with one of the surrounding wireless APs 14, 16, 18. Communication between the network and the client device 12 may then take place through the associated AP. The client device 12 may include any type of device or system that is capable of accessing a wireless network through a wireless AP including, for example, a laptop, palmtop, desktop, or tablet computer having wireless networking functionality, a personal digital assistant (PDA) having wireless networking functionality, a cellular telephone or other wireless handheld communicator, a pager, and audio/video device or system having wireless networking functionality, and/or others. The client device 12 will typically include at least one antenna to facilitate the transmission and/or reception of signals from a wireless channel. Any type of antenna(s) may be used including, for example, a dipole, a patch, a helical antenna, and/or others.

As used herein, a "useable" wireless connection is a connection between a client device and a network through which data can be transferred. In addition to association with an AP, there may be other requirements that a client device must satisfy to obtain a network connection that is "useable." For example, there may be an authentication process that needs to be successfully completed before a client device will be granted network access. Also, the client device may need to acquire an internet protocol (IP) address from a dynamic host configuration protocol (DHCP) server before network communications may be possible. Other requirements may also exist. In a typical network, a good connection is assumed as long as an association with an AP has been successfully established. That is, a network adapter within a client device will typically indicate to a user of the device that a good network connection exists, even when one of more of the requirements for a useable connection have not been satisfied. In one aspect of the present invention, techniques and structures are provided that are capable of maintaining a continuous useable network connection for a wireless client device in an automated (e.g., zero-configuration) fashion.

Figure 2:
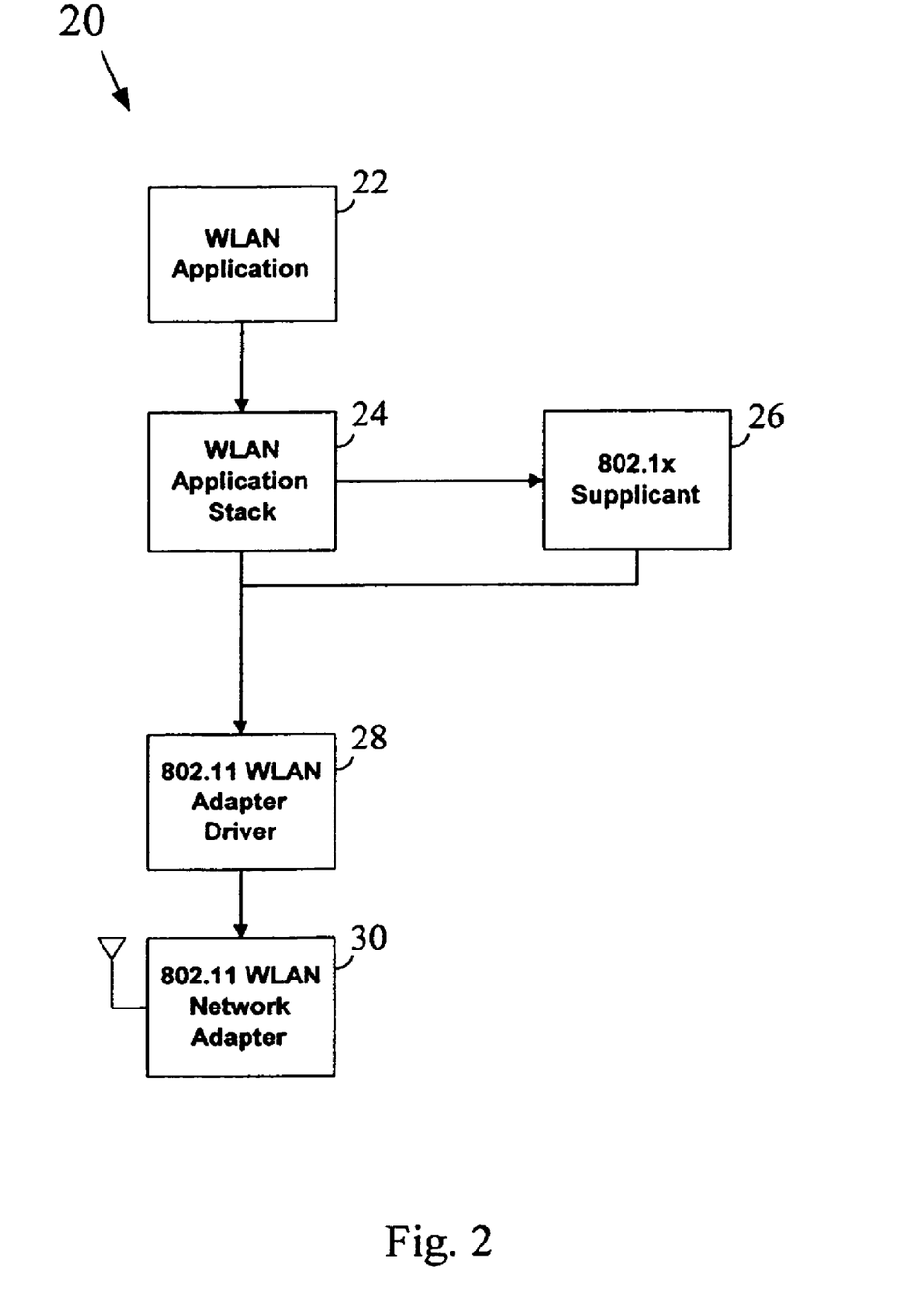
FIG. 2 is a block diagram illustrating example wireless networking functionality within a client device in accordance with an embodiment of the present invention.

FIG. 2 is a block diagram illustrating example wireless networking functionality 20 within a client device in accordance with an embodiment of the present invention. As illustrated, the networking functionality 20 includes: a wireless local area network (WLAN) application 22, a WLAN application stack 24, an IEEE 802.1x supplicant 26, an IEEE 802.11 WLAN adapter driver 28, and an IEEE 802.11 WLAN network adapter 30. The WLAN application 22 is a program executing within the client device that may need to access a network through the WLAN network adapter 30. The WLAN application stack 24 includes programs that execute within the client device in support of wireless LAN operation through the network adapter 30. The 802.1x supplicant 26 is a module that performs network and user based authentication procedures for the client device. The 802.11 WLAN adapter driver 28 is a software driver loaded within the client device that interfaces with the network adapter 30. Each of the above-described programs may be executed within one or more digital processing devices within the client device. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. The 802.11 WLAN network adapter 30 is a network interface component (e.g., a wireless network interface card (NIC), etc.) that is capable of communicating with a remote AP via a wireless channel.

The 802.11 WLAN wireless adapter 30 may also be capable of communicating with one or more other client devices in an ad hoc mode of operation. In at least one embodiment of the present invention, the inventive techniques are implemented primarily as part of the WLAN application stack 24 (although alternative embodiments also exist).

When a wireless network connection is desired, a wireless client device may first associate with an available AP. After association has been achieved, the WLAN application stack 24 within the client device may proceed to check one or more additional requirements of a "useable" wireless connection (e.g., whether authentication has been established, whether an IP address has been assigned to the client device, etc.). If it is determined that a useable connection does not exist, the WLAN application stack 24 may begin to look for another connection. In at least one approach, the WLAN application stack 24 will not report a successful connection to the user until all of the requirements of a useable connection have been satisfied.

Figure 3:
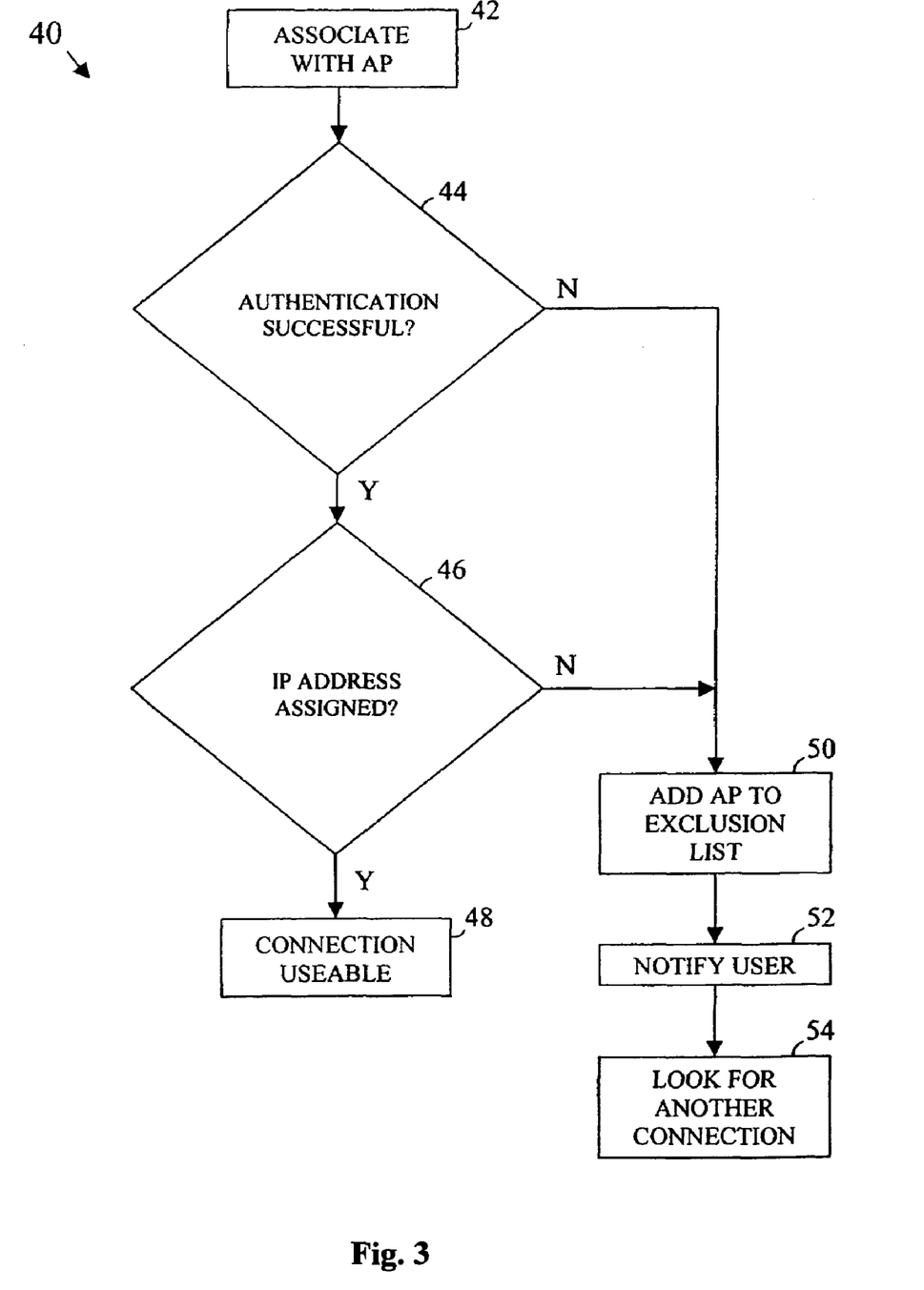
FIG. 3 is a flowchart illustrating an example method for establishing a network connection for a client device within a wireless network in accordance with an embodiment of the present invention.

FIG. 3 is a flowchart illustrating an example method 40 for establishing a connection for a client device within a wireless network in accordance with an embodiment of the present invention. First, the client device associates with an AP within range thereof (block 42). It is then determined whether an authentication procedure was successfully completed (block 44). If the authentication was successful, it may then be determined whether an IP address has been assigned to the client device by a DHCP server (block 46). If the IP address has been assigned, the connection is determined to be usable and is reported to the user as a "good" connection (block 48). If the authentication is not successful or an IP address has not been assigned, it is determined that a usable connection has not been established and the AP is added to an "exclusion list" (block 50). The exclusion list is a list that is maintained within the client device to identify APs that have failed to provide a usable connection in the past. Each entry in the list may include information such as, for example, the network name (SSID), the AP MAC address (BSSID), the operational band or mode (e.g., IEEE 802.11a, IEEE 802.11b, IEEE 802.11g, etc.), a failure reason bit mask, and/or other information. The user of the client device may subsequently be notified that the present AP has failed to provide a usable connection (block 52). The reason for the failure may also be provided to the user. The client device may then proceed to look for another network connection (block 54). This may be repeated until a useable connection is achieved. Additional or alternative tests could also be performed to determine whether a useable connection has been achieved.

When the user of the client device is notified that an AP has failed to provide a usable connection, the user may decide to address the failure with a system administrator or other IT personnel to attempt to rectify the problem. If the problem with the AP is eventually rectified, a manual connection may be attempted, removing the AP from the exclusion list.

For a client device to associate with an AP, an application within the client device may first configure a corresponding wireless adapter by applying a WLAN profile to the adapter. The WLAN profile is a predefined network configuration stored within the client device that may include information such as, for example, the network name for the profile identifying the corresponding network (e.g., a corporate network, a home network, a hotspot, etc.), the authentication requirements of the network, the encryption requirements of the network, and/or other network related information. A client device may have a number of different WLAN profiles stored therein. An AP is subsequently found that matches the current profile and an association is formed. In at least one embodiment of the invention, IEEE 802.1x authentication functionality is used to generate authentication success/failure events to indicate whether authentication was successful (e.g., IEEE 802.1x supplicant 26 that is associated with application stack 24 within FIG. 2). Within a system using IEEE 802.11 shared authentication, authentication failures may be detected by the wireless LAN driver. After a successful authentication, an event may be generated within the client device indicating whether or not the client device has successfully obtained an IP address from a dynamic host configuration protocol (DHCP) server. This may also be performed by IEEE 802.1x functionality within the client device. In an IEEE 802.11 shared authentication scenario, a WLAN application stack may be used to launch a thread to monitor the IP address of the client device on a media connect event from the driver. Other techniques for determining whether authentication has been achieved and whether an IP address has been assigned may alternatively be used. As described above, if either the authentication or the assignment of an IP address is unsuccessful, the currently associated AP will be placed on the exclusion list and the client device will look for another connection.

Figure 4:
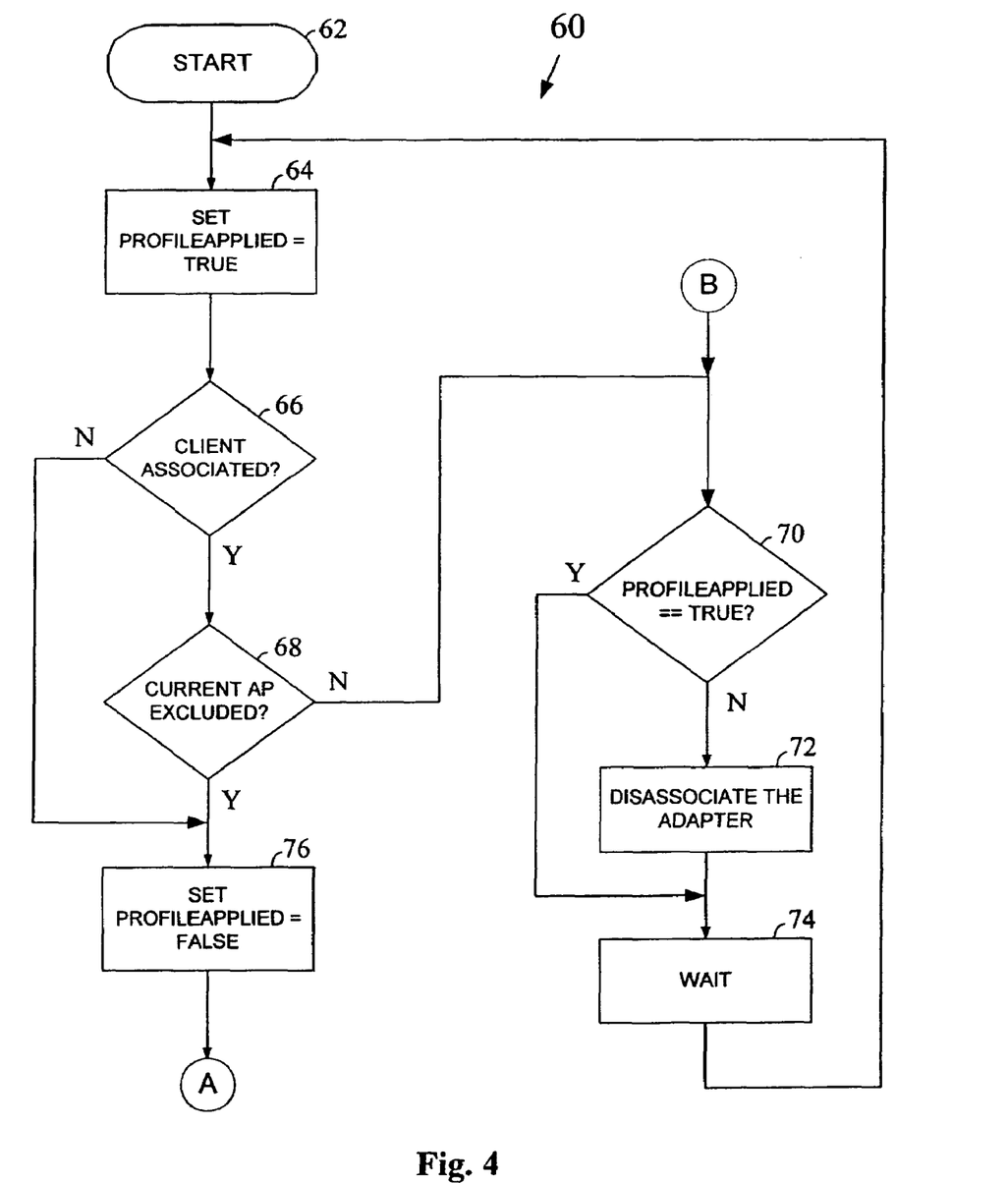
FIGS. 4 and 5 are portions of a flowchart illustrating an example method for operating a wireless client device to achieve a continuous, useable wireless connection in accordance with an embodiment of the present invention.
Figure 5:
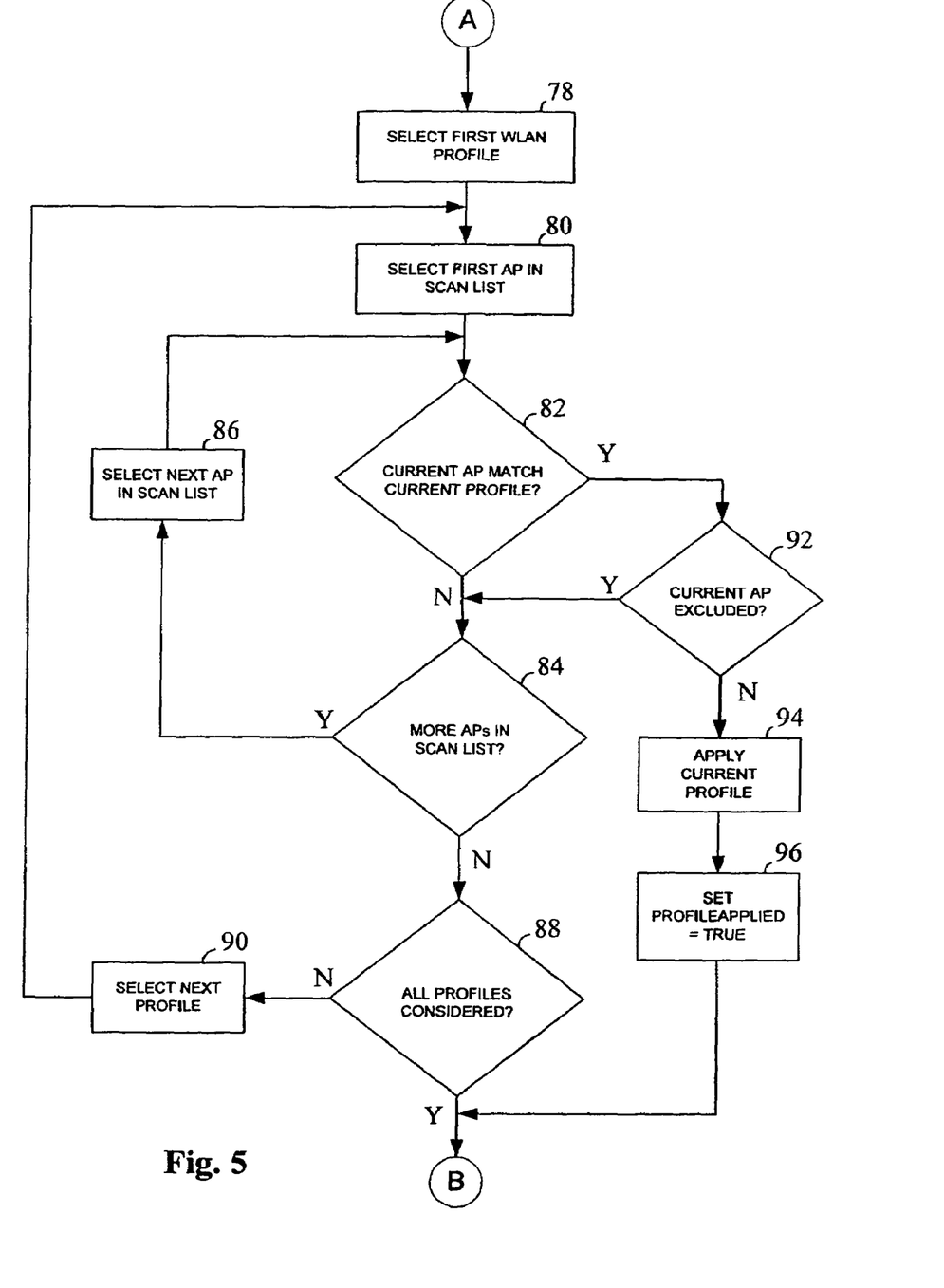

FIGS. 4 and 5 are portions of a flowchart illustrating an example method 60 for operating a wireless client device to achieve a continuous, useable wireless connection in accordance with an embodiment of the present invention. As illustrated, the flowchart portions are connected to one another using place markers labeled "A" and "B." The method 60 assumes that an exclusion list is being maintained by the client device to identify APs that have failed to provide a useable connection for the client device in the past. The method 60 may be continuously repeated by a client device during normal operation to ensure that a useable wireless connection is continuously available, if possible. After the method 60 starts (block 62), a Profileapplied variable is initialized to a "true" state (block 64). The Profileapplied variable is intended to track whether a WLAN profile is currently being applied for the client device. At the beginning of the method 60, it is assumed that a WLAN profile is currently being successfully applied. It is next determined whether the client device is currently associated with an AP (block 66). If the client device is not currently associated with an AP, the Profileapplied variable is set to a "false" state (block 76). This may occur, for example, when a previously associated client device loses its association for some reason (e.g., it moves out of range of the associated AP, etc.).

If the client device is currently associated with an AP, it is next determined whether the associated AP is on the exclusion list (block 68). If the associated AP is on the exclusion list, the Profileapplied variable is set to "false" (block 76). If, however, the associated AP is not on the exclusion list, it is next determined whether the Profileapplied variable is currently "true" (block 70). Because the Profileapplied variable is still true at this point, the method 60 proceeds to block 74 and waits. Eventually, the method 60 starts again from the beginning. In at least one embodiment, the method 60 is repeated once every N seconds (e.g., N=30) during normal device operation, although other timing schemes may alternatively be used.

After the Profileapplied variable is set to "false" in block 76 of FIG. 4, the method 60 enters the portion of the flowchart illustrated in FIG. 5 (via place marker A). As shown, this portion of the flowchart includes a nested loop arrangement that iterates through the various stored profiles and the various APs within a current scan list. The scan list is a list of APs that have been detected in range of the client device by, for example, sensing pilot signals transmitted by the APs. In an outer loop of the nested loop arrangement, the method 60 iterates through the WLAN profiles stored within the client device. In an inner loop, the method 60 iterates through each of the APs in the scan list of the client device. In this manner, a WLAN profile and AP may be found for the client device that are capable of providing a useable network connection for the client device.

With reference to FIG. 5, a first WLAN profile is initially selected for processing (block 78). A first AP within the scan list of the client device is also selected (block 80). It is next determined whether the current AP matches the current profile (block 82). If the current AP does not match the current profile, it is then determined whether there are more APs in the scan list that need to be processed (block 84). If there are more APs to be processed in the scan list, a next AP is then selected (block 86) and the process repeats for the new AP. If an AP is found that matches the current profile (block 82-Y), it is then determined whether this AP is on the exclusion list (block 92). If the AP is on the exclusion list, this AP will not be used. It is then determined whether there are more APs in the scan list that need to be processed (block 84). If so, a next AP is selected (block 86) and the process repeats for the new AP. If the current AP is not on the exclusion list (block 92-N), then a useable connection may be achieved using the current profile and the current AP. The current profile is thus applied to a network adapter associated with the client device (block 94) and the Profileapplied variable is set to true (block 96). The method 60 then returns to block 70 of FIG. 4 (via place marker B) where it is determined that Profileapplied is currently true. The method 60 then waits (block 74) and eventually restarts.

If all of the APs in the scan list have been tested without finding an AP that both (a) matches the current profile and (b) is not on the exclusion list (block 84-N), it is next determined whether all of the WLAN profiles have been considered (block 88). If all of the profiles have not been considered, then a next profile is selected for processing (block 90). The method 60 then returns to block 80 to iterate through the scan list again for the new profile. If all of the profiles have been considered (block 88-Y), the method 60 returns to block 70 of FIG. 4, via place marker B. At this point, the Profileapplied variable is still false. Thus, the client device is disassociated from all APs (block 72). As before, the method 60 then waits (block 74) and eventually restarts. On any subsequent iteration through the method 60, a useable connection may be reestablished and the user may be notified of same.

In at least one embodiment of the present invention, a priority system is established to determine the order for iterating through the WLAN profiles (e.g., in blocks 78 and 92 of FIG. 5). In this manner, more desirable profiles may be tested before less desirable profiles. In other embodiments, the profiles are processed in no particular order. In a similar manner, a priority scheme may be used to iterate through the APs in the scan list. For example, in one possible approach, the APs may be tested in the order of decreasing receive strength. Other priority schemes may alternatively be used. In at least one embodiment, the APs are processed in no particular order.

In the description above, some language has been used that is typically associated with the IEEE 802.11 wireless networking standard and its progeny. It should be appreciated, however, that the techniques and structures of the present invention are not limited to use in IEEE 802.11 networks. That is, features of the invention have application in all wireless networks.

The techniques and structures of the present invention may be implemented in any of a variety of different forms. For example, features of the invention may be embodied within cellular telephones and other handheld wireless communicators, personal digital assistants, computers, pagers, satellite communicators, cameras, audio/video devices, network interface cards (NICs) and other network interface structures, integrated circuits, as instructions and/or data structures stored on machine readable media, and/or in other formats. Examples of different types of machine readable media that may be used include floppy diskettes, hard disks, optical disks, compact disc read only memories (CD-ROMs), magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
   determining whether a client device currently has a useable wireless network connection; and
   when said client device does not currently have a useable wireless network connection, iterating through a plurality of wireless LAN (WLAN) profiles within said wireless device to attempt to find a WLAN profile that is capable of providing a useable wireless network connection for said client device;
   wherein iterating through a plurality of WLAN profiles includes:
      selecting a first WLAN profile in said plurality of wireless LAN profiles;
      progressing through a plurality of wireless access points (APs) on a scan list to identify a wireless AP, if any, that matches said first WLAN profile; and
      when a wireless AP is identified that matches said first WLAN profile, determining whether said identified wireless AP is on an exclusion list stored within said client device, said exclusion list identifying wireless APs that have failed to provide a usable wireless network connection for said client device in the past.

2. The method of claim 1, further comprising:
   when iterating through said plurality of WLAN profiles identifies a WLAN profile that is capable of providing a useable wireless network connection for said client device, applying said identified WLAN profile to a wireless network adapter associated with said client device.

3. The method of claim 1, wherein:
determining whether said client device currently has a useable wireless network connection includes determining whether said client device is currently associated with a wireless access point (AP), wherein said client device does not currently have a useable wireless network connection when said client device is not currently associated with a wireless AP.

4. The method of claim 3, wherein:
determining whether said client device currently has a useable wireless network connection further includes, when said client device is determined to be currently associated with a wireless AP, determining whether said current wireless AP is on said exclusion.

5. The method of claim 1, further comprising:
repeating determining and iterating at predefined times during operation of said client device to maintain a continuous usable wireless connection.

6. The method of claim 1, further comprising:
disassociating said client device from a wireless AP, if currently associated, when iterating through said plurality of WLAN profiles fails to identify a profile that is capable of providing a useable network connection for said client device.

7. The method of claim 1, further comprising:
applying said first WLAN profile to a wireless network adapter associated with said client device when it is determined that said identified wireless AP is not on said exclusion list.

8. The method of claim 1, wherein:
iterating through a plurality of WLAN profiles further includes repeating selecting and progressing for another WLAN profile in said plurality of WLAN profiles when all wireless APs in said scan list have been processed for said first WLAN profile without identifying a wireless AP that both (a) matches the current WLAN profile and (b) is not on said exclusion list.

9. An apparatus comprising:
a controller to determine whether said apparatus currently has a useable wireless network connection and to automatically iterate through a plurality of WLAN profiles stored within said apparatus to attempt to find a WLAN profile that is capable of providing a useable wireless network connection when it is determined that said apparatus does not currently have a useable wireless network connection, wherein said iteration through said plurality of WLAN profiles includes operation to:
select a first WLAN profile in said plurality of wireless LAN profiles;
progress through a plurality of wireless access points (APs) on a scan list to identify a wireless AP, if any, that matches said first WLAN profile; and
when a wireless AP is identified that matches said first WLAN profile, determine whether said identified wireless AP is on an exclusion list stored within said apparatus, said exclusion list identifying wireless APs that have failed to provide a usable wireless network connection for said apparatus in the past.

10. The apparatus of claim 9, wherein:
said controller is to determine whether said apparatus currently has a useable wireless network connection by determining whether said apparatus is currently associated with a wireless access point (AP) and, when said apparatus is currently associated with a wireless AP, determining whether said wireless AP is on an exclusion list stored within said apparatus, said exclusion list being a list of APs that have failed to provide a useable wireless network connection to said apparatus in the past, wherein said apparatus does not currently have a useable wireless network connection when said apparatus is currently associated with a wireless AP that is on said exclusion list.

11. The apparatus of claim 9, wherein:
said iteration through said plurality of WLAN profiles includes: when no wireless AP is identified in said scan list that both matches said first WLAN profile and is not on said exclusion list, select a second WLAN profile in said plurality of wireless LAN profiles, and progress through said plurality of wireless access points (APs) on said scan list to identify a wireless AP, if any, that matches said second WLAN profile and, when a wireless AP is identified that matches said second WLAN profile, determine whether said identified wireless AP is on said exclusion list.

12. The apparatus of claim 9, further comprising:
a wireless network adapter coupled to said controller.

13. The apparatus of claim 12, wherein:
said controller, when iterating through said plurality of WLAN profiles, is to apply a first WLAN profile to said wireless network adapter when it is determined that at least one AP on a scan list matches said first WLAN profile and said at least one AP is not on an exclusion list stored within said apparatus, said exclusion list being a list of APs that have failed to provide a useable wireless network connection to said apparatus in the past.

14. The apparatus of claim 9, wherein:
said controller is to disassociate said apparatus from all wireless APs when automatically iterating through said plurality of WLAN profiles fails to identify a WLAN profile that is capable of providing a useable wireless network connection for said apparatus.

15. A system comprising:
a dipole antenna to facilitate transmission of signals into a wireless channel; and
a controller, in communication with said dipole antenna, to determine whether said system currently has a useable wireless network connection and to automatically iterate through a plurality of WLAN profiles stored within said system to attempt to find a WLAN profile that is capable of providing a useable wireless network connection when it is determined that said system does not currently have a useable wireless network connection, wherein said iteration through said plurality of WLAN profiles includes operation to:
select a first WLAN profile in said plurality of wireless LAN profiles;
progress through a plurality of wireless access points (APs) on a scan list to identify a wireless AP, if any, that matches said first WLAN profile; and
when a wireless AP is identified that matches said first WLAN profile, determining whether said identified wireless AP is on an exclusion list stored within said system, said exclusion list identifying wireless APs that have failed to provide a usable wireless network connection for said system in the past.

16. The system of claim 15, further comprising:
a wireless network adapter coupled between said controller and said dipole antenna.

17. The system of claim 16, wherein:
said controller, when iterating through said plurality of WLAN profiles, is to apply a first WLAN profile to said wireless network adapter when it is determined that at least one AP on a scan list matches said first WLAN profile and said at least one AP is not on an exclusion list stored within said system, said exclusion list being a list of APs that have failed to provide a useable wireless network connection to said system in the past.

18. The system of claim 15, wherein:
said controller is to disassociate said system from all wireless APs when automatically iterating through said plurality of WLAN profiles fails to identify a WLAN profile that is capable of providing a useable wireless network connection for said system.

19. A computer readable medium having instructions stored thereon that, when executed by a computing platform, operate to: determine whether a client device currently has a useable wireless network connection; and when said client device does not currently have a useable wireless network connection, iterate through a plurality of WLAN profiles within said wireless device to attempt to find a WLAN profile that is capable of providing a useable wireless network connection for said client device, wherein said iteration through said plurality of WLAN profiles includes operation to:
  Select a first WLAN profile in said plurality of wireless LAN profiles; progress through a plurality of wireless access points (APs) on a scan list to identify a wireless AP, if any, that matches said first WLAN profile; and when a wireless AP is identified that matches said first WLAN profile, determining whether said identified wireless AP is on an exclusion list stored within said client device, said exclusion list identifying wireless APs that have failed to provide a useable wireless network connection for said client device in the past.

20. The computer readable medium of claim 19, wherein said instructions further operate to:
  When iteration through said plurality of WLAN profiles identifies a WLAN profile that is capable of providing a useable wireless network connection for said client device, apply said identified WLAN profile to a wireless network adapter associated with said client device.

21. The computer readable medium of claim 19, wherein said instructions further operate to:
  Disassociate said client device from a wireless AP, if currently associated, when iteration through said plurality of WLAN profiles fails to identify a profile that is capable of providing a useable wireless network connection for said client device.

* * * * *